(12) United States Patent
Kadobayashi

(10) Patent No.: US 8,947,690 B2
(45) Date of Patent: Feb. 3, 2015

(54) IMAGE READING APPARATUS AND IMAGE FORMING APPARATUS

(71) Applicant: KYOCERA Document Solutions Inc., Osaka (JP)

(72) Inventor: Mizue Kadobayashi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/142,561

(22) Filed: Dec. 27, 2013

(65) Prior Publication Data

US 2014/0226172 A1 Aug. 14, 2014

(30) Foreign Application Priority Data

Feb. 8, 2013 (JP) ................. 2013-023743
Dec. 20, 2013 (JP) ................. 2013-264255
Dec. 20, 2013 (JP) ................. 2013-264256

(51) Int. Cl.
| | | |
|---|---|---|
| G06F 3/12 | (2006.01) | |
| H04N 1/00 | (2006.01) | |
| H04N 1/10 | (2006.01) | |
| H04N 1/40 | (2006.01) | |
| H04N 1/04 | (2006.01) | |
| G03G 15/04 | (2006.01) | |
| G03G 15/00 | (2006.01) | |

(52) U.S. Cl.
CPC ....... *H04N 1/00896* (2013.01); *H04N 1/00013* (2013.01); *H04N 1/00037* (2013.01); *H04N 1/00551* (2013.01); *H04N 1/00588* (2013.01); *H04N 1/00689* (2013.01); *H04N 1/10* (2013.01)

USPC .......... 358/1.13; 358/449; 358/486; 358/488; 399/189; 399/380

(58) Field of Classification Search
CPC .......... H04N 1/04; H04N 1/00; H06N 1/0461
See application file for complete search history.

(56) References Cited

U.S. PATENT DOCUMENTS

2006/0193013 A1* 8/2006 Hoshi ........................... 358/474
2009/0244649 A1* 10/2009 Shinkawa ..................... 358/474

FOREIGN PATENT DOCUMENTS

JP 2006-010716 A 1/2006
JP 2008-216527 A 9/2008

* cited by examiner

*Primary Examiner* — Fred Guillermety
*Assistant Examiner* — Henok A Shiferaw
(74) *Attorney, Agent, or Firm* — Knobbe, Martens, Olson & Bear LLP

(57) ABSTRACT

An image reading apparatus includes a carriage, a carriage detector, and a control unit. The carriage detector outputs a detection signal of the carriage when the carriage is at the home position, and outputs a non-detection signal of the carriage when the carriage is located closer to a document size reading position than a predetermined position between the home position and the document size reading position. The control unit moves the carriage to the home position when the image reading apparatus enters a sleep mode, keeps the carriage detained while performing initialization after the sleep mode is cancelled, and moves the carriage, upon receipt of a scanning instruction after the initialization is completed, toward the document size reading position in the case where the carriage detector outputs the detection signal of the carriage.

6 Claims, 14 Drawing Sheets

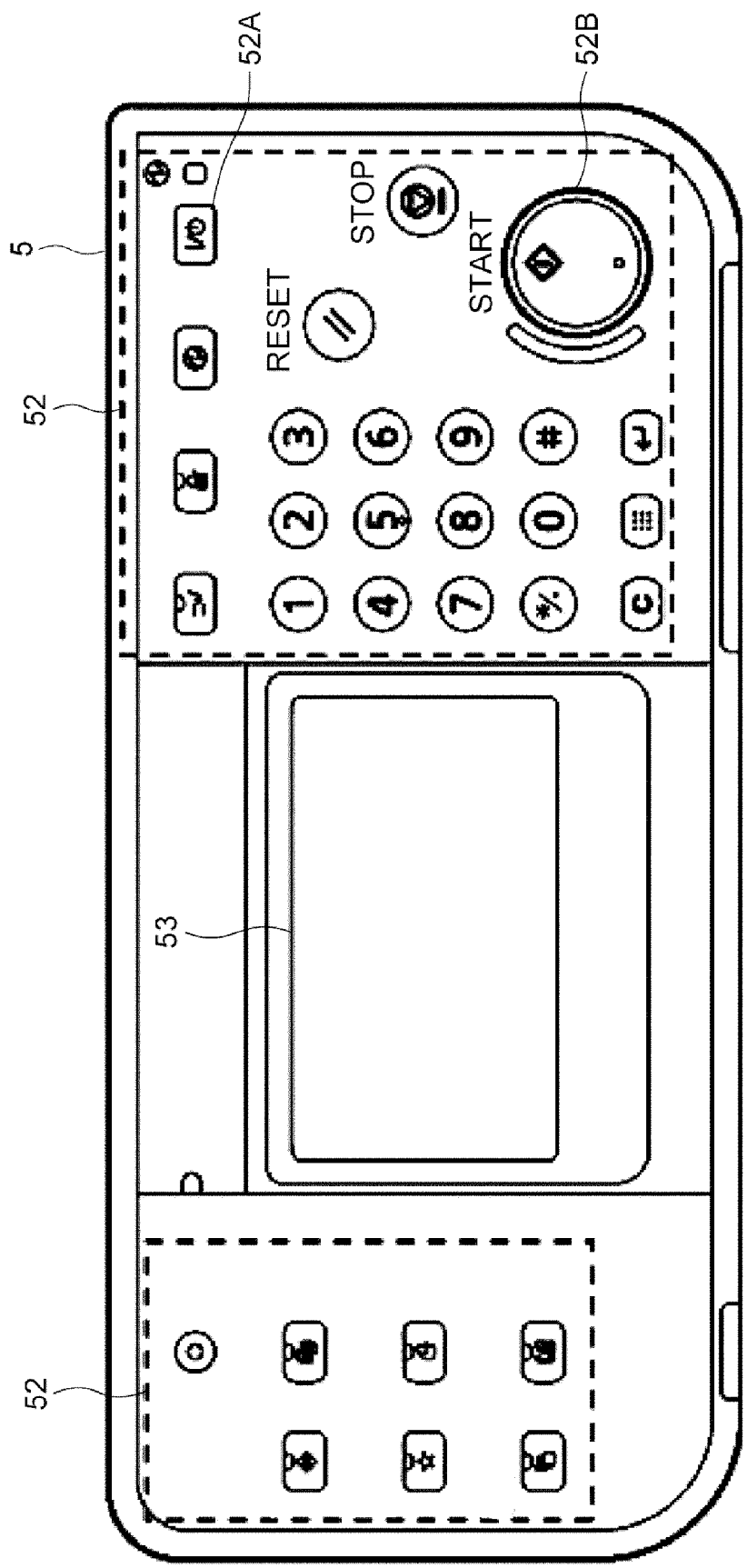

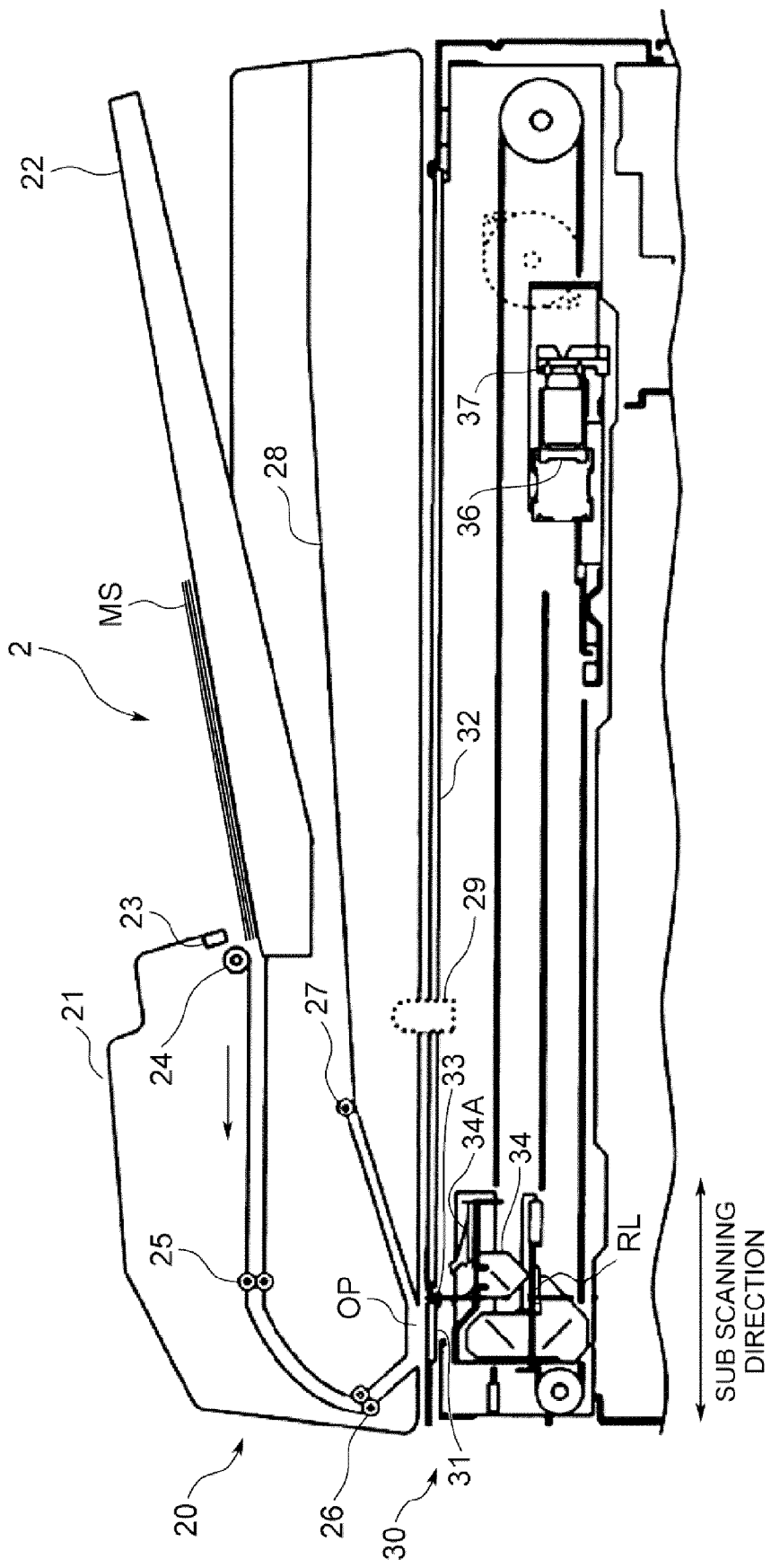

IMAGE READING APPARATUS AND IMAGE FORMING APPARATUS

INCORPORATION BY REFERENCE

This application claims priority to Japanese Patent Application No. 2013-023743 filed on Feb. 8, 2013, Japanese Patent Application No. 2013-264255 filed on Dec. 20, 2013, and Japanese Patent Application No. 2013-264256 filed on Dec. 20, 2013. The entire disclosures of Japanese Patent Applications No. 2013-023743, No. 2013-264255 and No. 2013-264256 are hereby incorporated herein by reference.

BACKGROUND

1. Technical Field

The present disclosure relates to an image reading apparatus and an image forming apparatus.

2. Related Art

Image reading apparatuses and image forming apparatuses operable in a sleep mode are configured to set a carriage at a home position when entering the sleep mode. In an initialization process performed when the sleep mode is cancelled, the carriage is moved to the home position because the carriage may be displaced from the home position because of vibration or the like, during the sleep mode.

SUMMARY

In an aspect, the disclosure proposes further improvement of the foregoing technique.

The disclosure provides an image reading apparatus including a document table, a reading unit, a carriage detector, a reception unit, a detection unit, and a control unit.

The reading unit includes a carriage configured to reciprocate in a sub scanning direction, and emit reading light onto a source document placed on the document table and receive reflected light of the reading light.

The carriage detector is located between a home position and a document size reading position of the carriage, and configured to (i) output a detection signal of the carriage when the carriage is at the home position and (ii) output a non-detection signal of the carriage when the carriage is located closer to the document size reading position than a predetermined position between the home position and the document size reading position.

The reception unit is configured to receive an instruction to read the source document.

The detection unit is configured to detect an operation of setting the source document on the image reading apparatus.

The control unit is configured to control a position of the carriage, so as to (i) move the carriage to the home position when the image reading apparatus enters a sleep mode, (ii) keep the carriage detained while performing initialization after the sleep mode is cancelled, (iii) confirm, after the initialization is completed, a signal outputted from the carriage detector in the case where the reception unit receives the reading instruction or in the case where the detection unit detects the operation of setting the source document on the image reading apparatus, and (iv) move the carriage toward the document size reading position in the case where the carriage detector outputs the detection signal of the carriage.

In another aspect, the disclosure provides an image forming apparatus including the foregoing image reading apparatus and an image forming unit.

The image forming unit is configured to form an image read by the reading unit on a recording sheet.

BRIEF DESCRIPTION OF THE DRAWINGS

FIG. 3 is a plan view showing an operation/display unit according to the embodiment.

FIGS. 4A and 4B are a cross-sectional view and a fragmentary perspective view respectively, showing a mechanical configuration of an image reading apparatus according to the embodiment.

DETAILED DESCRIPTION

Figure 1:
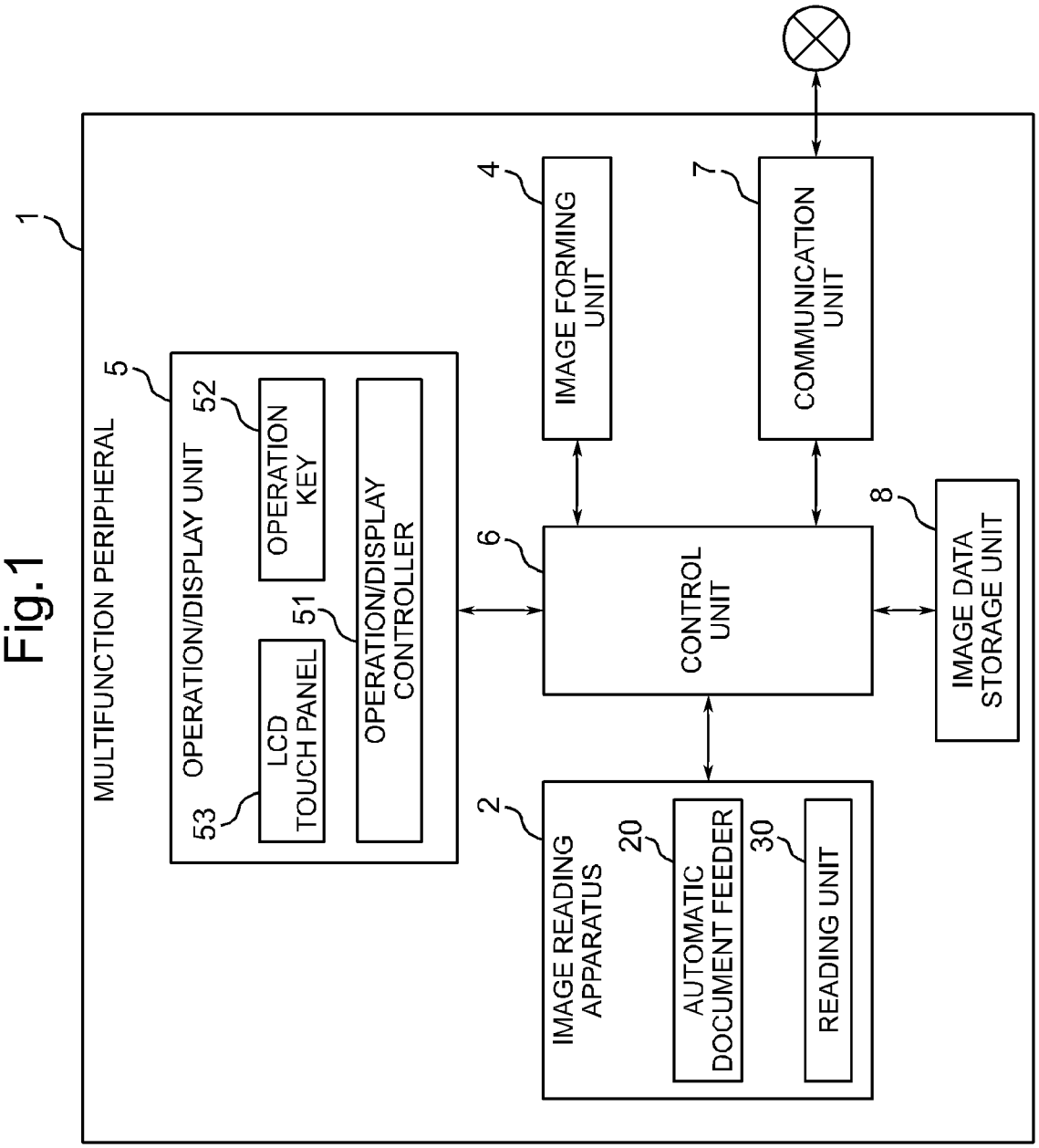
FIG. 1 is a functional block diagram of a multifunction peripheral according to an embodiment of the disclosure.
Figure 2:
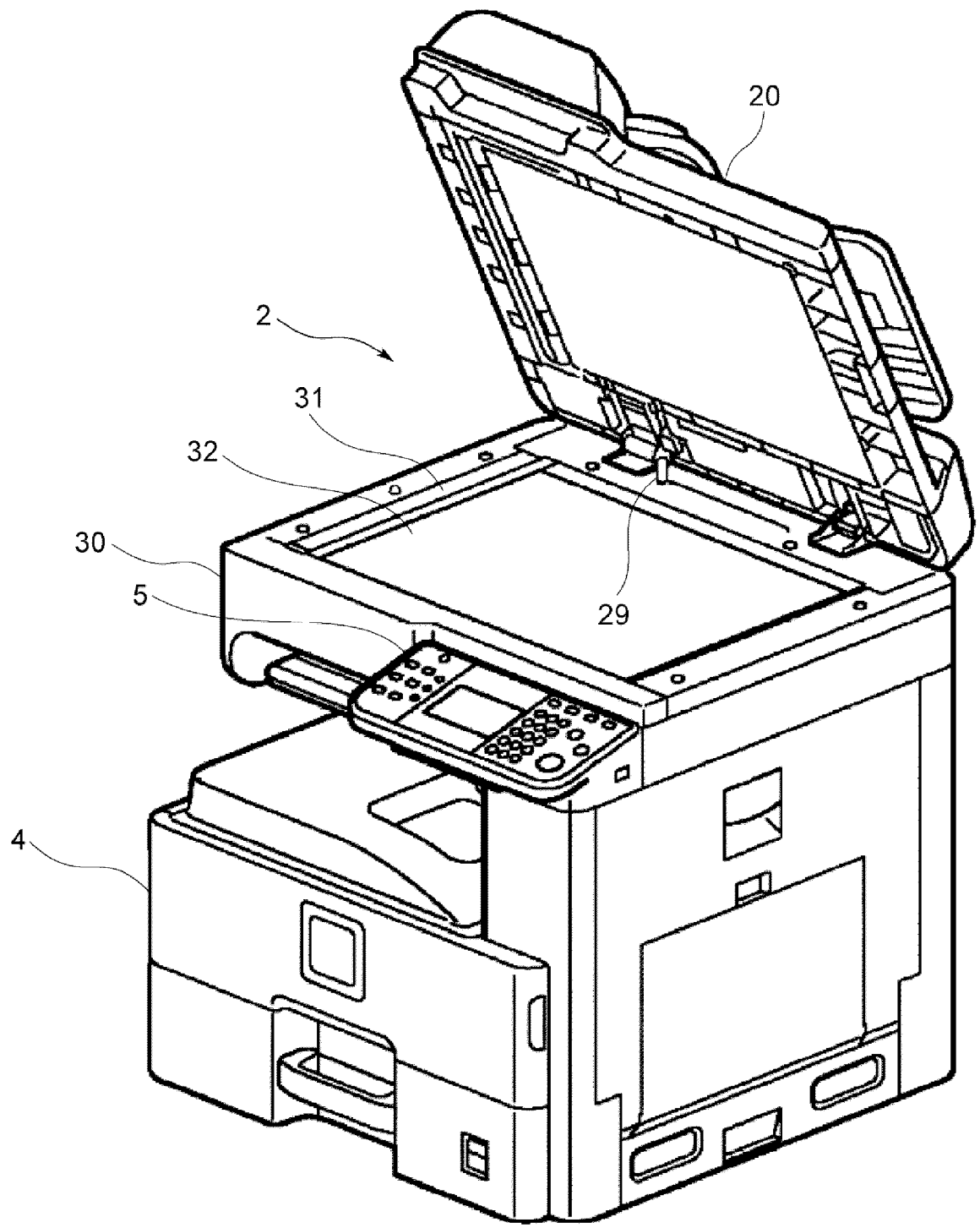
FIG. 2 is a perspective view showing the appearance of the multifunction peripheral according to the embodiment.

A multifunction peripheral 1 (image forming apparatus) according to this embodiment is configured to form an image on a recording sheet by an electrophotography method, and includes an image reading apparatus 2, an image forming unit 4, an operation/display unit 5, a control unit 6, a communication unit 7, and an image data storage unit 8, as shown in FIGS. 1 and 2. The multifunction peripheral 1 is configured to operate, under control by the control unit 6, in a sleep mode in which power is supplied only to minimum necessary constituents when no instruction is inputted from outside for a predetermined period of time.

The operation/display unit 5 includes an operation/display controller 51, operation keys 52 which are hardware keys, and an LCD touch panel 53 that displays software keys and images. The operation/display controller 51 serves to control the operation keys 52 and the LCD touch panel 53 under control by the control unit 6.

The operation keys 52 are physically mounted as hardware keys on the operation/display unit 5 as shown in FIG. 3, examples of which include a power key 52A, a start key 52B, a stop/clear key, and a ten-key (numeric input key). The power key 52A is an operation key for inputting, when the multifunction peripheral 1 is in the sleep mode, an instruction to return to the normal mode from the sleep mode. The start key 52B is an operation key for inputting execution instructions such as a copying instruction.

The image reading apparatus 2 includes an automatic document feeder (ADF) 20 and a reading unit 30, as shown in FIGS. 1, 2, and 4A. The image reading apparatus 2 is configured to read a source document MS delivered from the ADF 20 or a source document MS placed on the reading unit 30, according to a control signal inputted from the control unit 6. Document image data thus read is stored in the image data storage unit 8.

The ADF 20 is provided on the upper face of the reading unit 30 so as to open and close about a hinge, and configured to deliver one by one a plurality of source documents MS placed on the document feed tray 22, to a reading position of the source document. The ADF 20 also serves as a document holding cover when the source document MS on the reading unit 30 is read. The ADF 20 includes, as shown in FIG. 4A, a platen cover 21, a document feed tray 22, a document setting detection unit 23, a pickup roller 24, a transport roller 25, a resist roller 26, a discharge roller 27, a document discharge tray 28, and an ADF position detector 29.

The document setting detection unit 23 detects the leading edge of the source document MS set on the document feed tray 22, and outputs a detection signal indicating the detection result to the control unit 6.

An opening OP is provided between the resist roller 26 and the discharge roller 27, as shown in FIG. 4A. The opening OP is of a strip shape having a predetermined width in the sub scanning direction (transport direction of source document), and located on the bottom portion of the ADF 20, so as to oppose the flow-scanning position of the reading unit 30. The surface of the source document MS delivered from the ADF 20 is exposed to the reading unit 30 through the opening OP.

The document discharge tray 28 is a region for receiving the source document MS delivered from the discharge roller 27. The ADF position detector 29 detects whether the ADF 20 is open or closed in its use as the document holding cover, and outputs the detection signal to the control unit 6.

In this embodiment, the document setting detection unit 23 and the ADF position detector 29 (detection unit) are configured to detect the operation of setting the source document on the document feed tray 22 of the ADF 20, and the open or closed state of the ADF 20 in its use as the document holding cover. In other words, the document setting detection unit 23 and the ADF position detector 29 serve as detection units that detect the process in which the source document is set on the image reading apparatus 1.

Figure 4B:
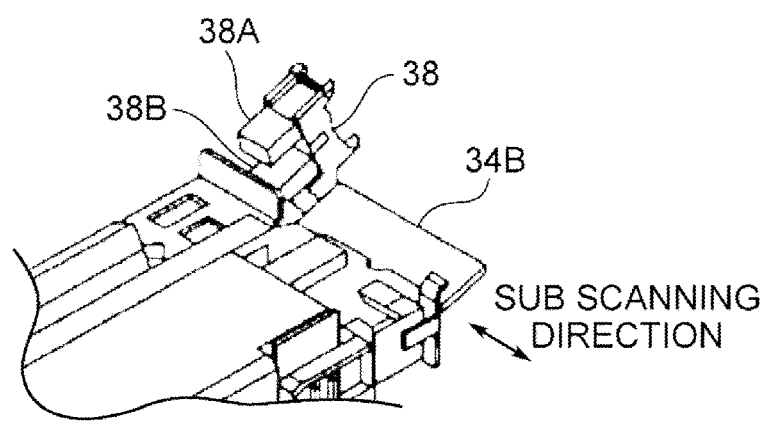
Figure 5:
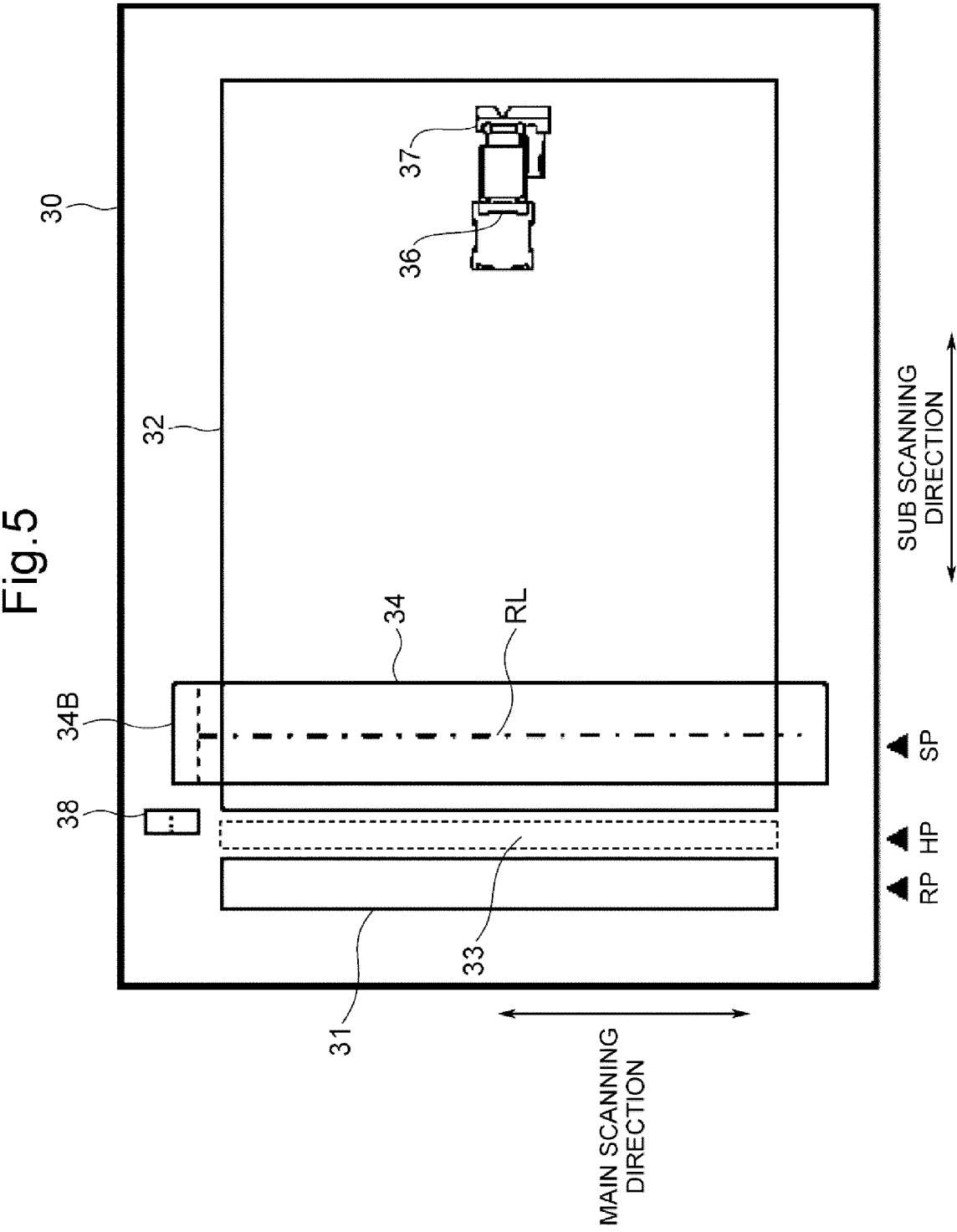
FIG. 5 is a schematic plan view showing a mechanical configuration in a reading unit according to the embodiment.

The reading unit 30 includes, as shown in FIGS. 4A, 4B, and 5, a first platen glass 31 (document table), a second platen glass 32 (document table), a white reference plate 33, a carriage 34, a condenser lens 36, a charge coupled device (CCD) sensor 37, and a carriage detector 38. The reading unit 30 is configured to read the source document MS delivered from the ADF 20, or the source document MS placed by a user on the second platen glass 32.

The white reference plate 33 is a white plate located between the first platen glass 31 and the second platen glass 32. The white reference plate 33 is read when shading correction is performed, so that the image data of the white reference plate 33 is utilized as white reference data for the shading correction.

The carriage 34 includes a light emitting diode (LED) 34A serving as the light source, and a plurality of mirrors that reflect reading light reflected by the source document MS toward the CCD sensor 37. The carriage 34 is configured to reciprocate in the sub scanning direction along a rail. The carriage 34 includes a light shielding plate 34B located on an end portion thereof (deeper end) in the main scanning direction, as shown in FIG. 4B. The light shielding plate 34B is used for detecting the position of the carriage 34 with a carriage detector 38 (photo interrupter (PI) sensor) to be subsequently described. The light shielding plate 34B is formed so as to pass, when the carriage 34 moves, between a light emitter 38A and a light receiver 38B disposed to each other on the carriage detector 38.

The carriage 34 is moved to various positions, for example to a home position HP of the carriage 34 shown in FIG. 5 when the multifunction peripheral 1 enters the sleep mode.

The carriage 34 is also moved to a document size reading position SP shown in FIG. 5, to read the size of the source document MS in the main scanning direction in the case of reading the source document MS placed on the second platen glass 32. The document size reading position SP is located on the right of the home position HP (forward movement) in the sub scanning direction.

Then the carriage 34 emits the reading light to the source document MS to thereby read the source document MS, while moving to the right in the sub scanning direction after once returning to the home position HP. Accordingly, the reading light sequentially obtained from the source document MS is reflected by the mirrors of the carriage 34, and enters the condenser lens 36.

Further, the carriage 34 is moved to a flow-scanning position RP shown in FIG. 5, when the source document MS is delivered from the ADF 20. In other words, the carriage 34 is fixed at a position under the first platen glass 31 in the case of reading the source document MS delivered from the ADF 20.

The condenser lens 36 collects the reading light incident thereon from the mirrors and forms an image on the light receiving surface of the CCD sensor 37. The CCD sensor 37 performs photoelectric conversion of the reading light thus received, to output an electrical signal.

The carriage detector 38 is located between the home position HP and the document size reading position SP, and behind the light shielding plate 34B provided on the carriage 34. The carriage detector 38 is a PI sensor including the light emitter 38A and the light receiver 38B opposed to each other in a vertical direction. The carriage detector 38 detects the light shielding plate 34B passing between the light emitter 38A and the light receiver 38B when the carriage 34 moves, and outputs a detection signal indicating the detection result to the control unit 6. For example, the carriage detector 38 outputs an ON-signal as detection signal when the light shielding plate 34B is located between the light emitter 38A and the light receiver 38B, and outputs an OFF-signal when the light shielding plate 34B is deviated from the region between the light emitter 38A and the light receiver 38B. The carriage detector 38 outputs an ON-signal to the control unit 6 when the carriage 34 is located at the home position HP. In contrast, when the carriage 34 is located closer to the document size reading position SP than a predetermined position between the home position HP and the document size reading position SP.

Figure 6:
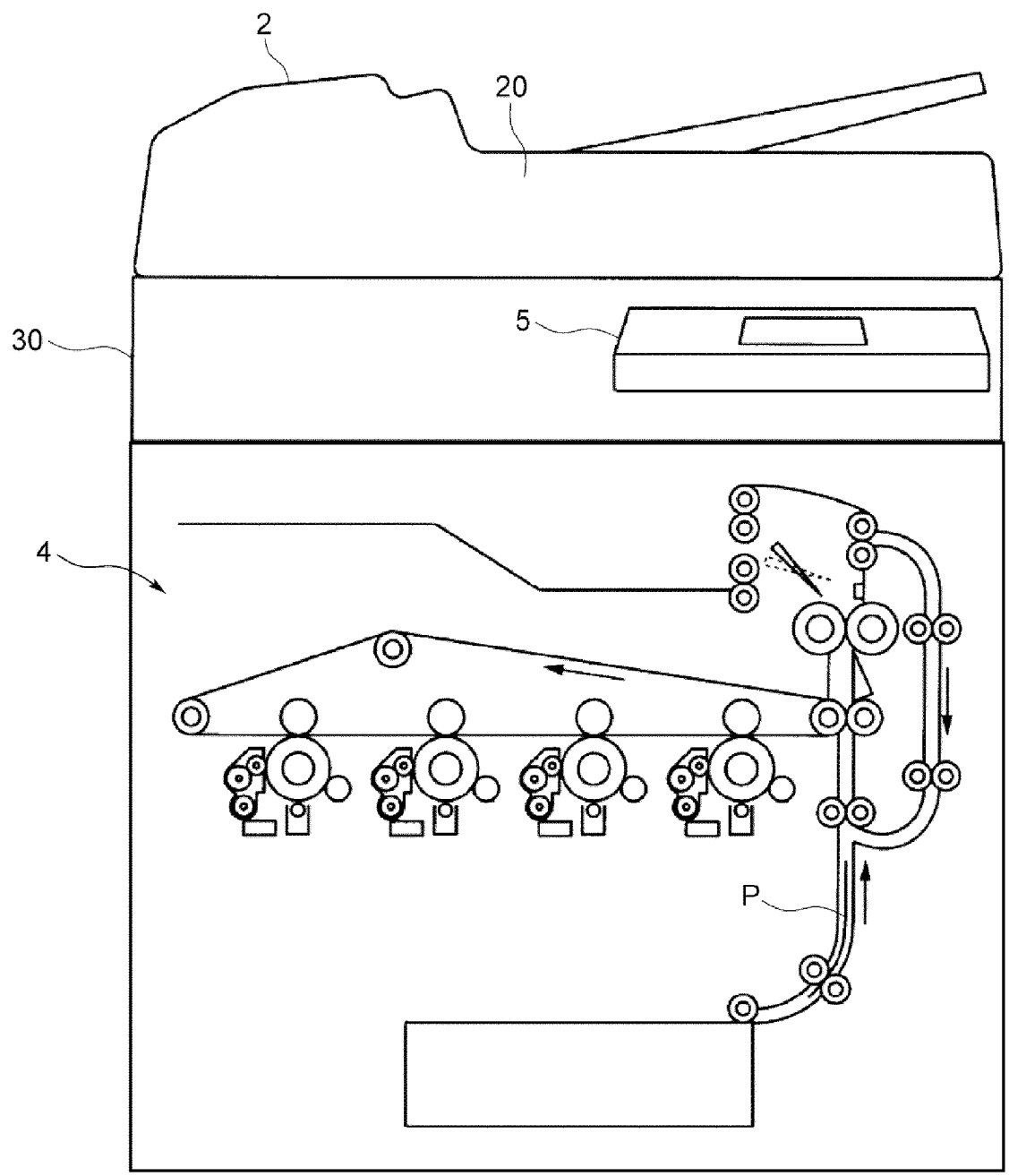
FIG. 6 is a schematic cross-sectional view showing a mechanical configuration of an image forming unit according to the embodiment.
Figure 7:
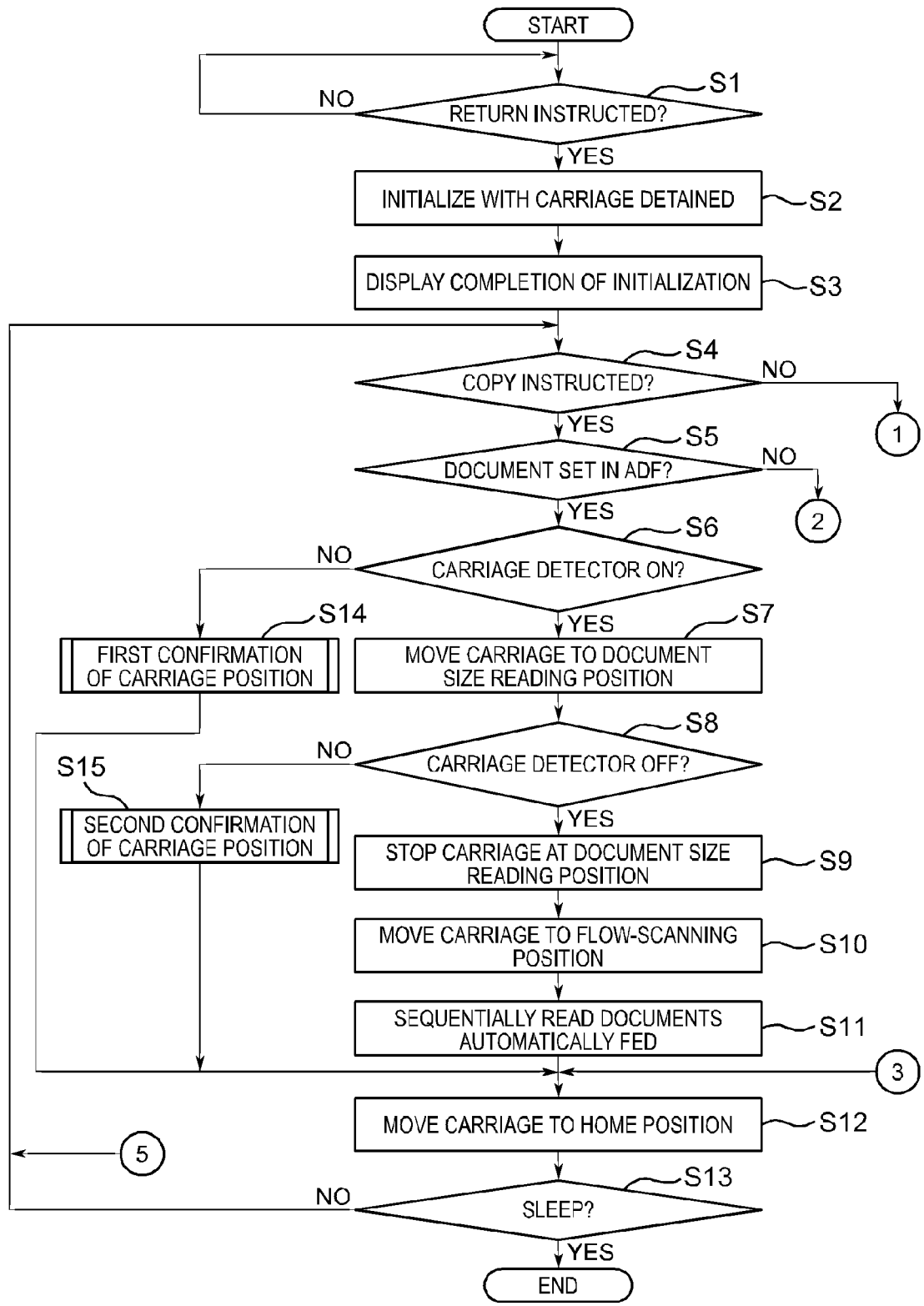
FIG. 7 is a flowchart showing an operation process of a multifunction peripheral according to the embodiment.

Referring to FIG. 6, the image forming unit 4 is configured to form a toner image based on the image data, on a recording sheet P drawn out from a paper feed cassette.

The communication unit 7 performs communication with an external multifunction peripheral 1 or a facsimile machine through a telephone network, or with an external personal computer and so forth via a local area network (LAN).

The control unit 6 includes a central processing unit (CPU), a read only memory (ROM), a random access memory (RAM), and an interface circuit. The control unit 6 performs computation and communication with the functional units according to various computing and control programs stored in the ROM, to thereby control the overall operation of the multifunction peripheral A. For example, the control unit 6 performs the initialization when the sleep mode is cancelled, the details of which will be subsequently described.

The control unit 6 also serves as a reception unit that receives an instruction to read the source document. The reading instruction is inputted to the control unit 6 through the operation/display unit 5. The control unit 6 can also receive a reading instruction of the source document transmitted from an external personal computer or the like and received by the communication unit 7.

Referring now to FIGS. 7 to 13, operations of the multifunction peripheral 1 configured as above will be described. For example, when the user wishes to copy the source document MS, the user presses the power key 52A to reset the multifunction peripheral 1 to the normal mode, in the case where the multifunction peripheral 1 is in the sleep mode.

At this point, the control unit 6 performs a distinctive operation described below, for returning to the normal mode from the sleep mode. First, the control unit 6 decides whether a returning instruction has been received by a press of the power key 52A (step S1). In the case where the returning instruction has not been received (NO at step S1), the control unit 6 returns to the step S1.

Figure 13A:
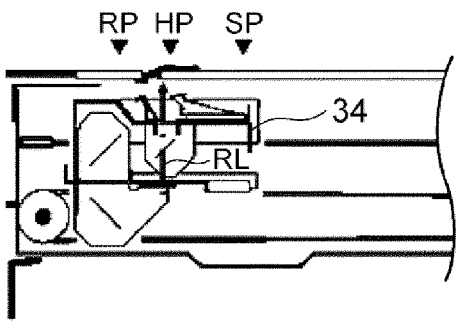
FIG. 13A, FIG. 13B, FIG. 13C, FIG. 13D, FIG. 13E, FIG. 13F, FIG. 13G, and FIG. 13H are drawings each showing a position of a carriage according to the embodiment.
Figure 13B:
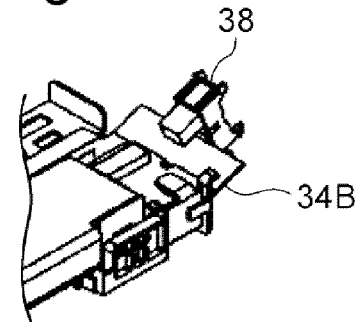
Figure 13C:
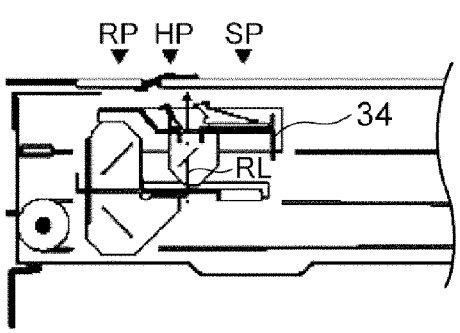
Figure 13D:
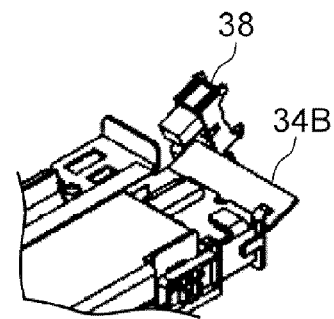
Figure 13E:
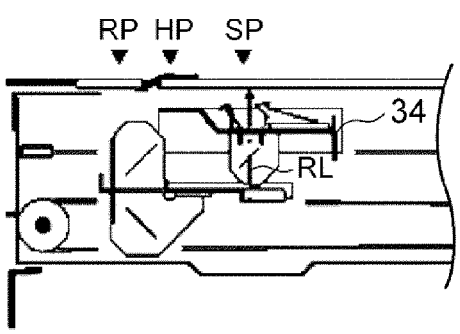
Figure 13F:
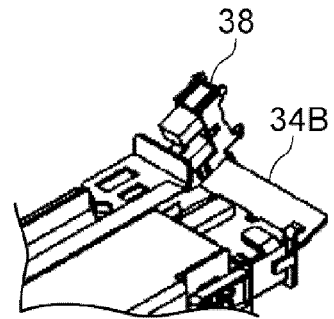

In the case where the returning instruction is received (YES at step S1), the control unit 6 performs the initialization for returning to the normal mode from the sleep mode, with the carriage 34 detained (step S2). In other words, the control unit 6 keeps the carriage 34 detained while performing the initialization. The carriage 34 is supposed to be located at the home position HP as shown in FIGS. 13A and 13B, unless the carriage is displaced during the sleep mode owing to vibration or the like.

As above, the operation according to this embodiment skips a process of moving the carriage 34 to the home position HP (homing) in the initialization from the sleep mode, and therefore the time for performing the initialization can be shortened.

Upon completing the initialization, the control unit 6 causes the LCD touch panel 53 to display a message to the effect that the initialization has been completed, and enters a standby state in the normal mode (step S3).

Then the control unit 6 decides whether a copying instruction (reading instruction) has been received by a press of the start key 52B (step S4). In the case where the copying instruction has been received (YES at step S4), the control unit 6 decides whether the source document MS is set on the document feed tray 22 of the ADF 20 according to the detection signal inputted from the document setting detection unit 23 of the ADF 20 (step S5).

In the case where the source document MS is set on the document feed tray 22 of the ADF 20 (YES at step S5), the control unit 6 decides whether the detection signal inputted from the carriage detector 38 is ON (step S6). In the case where the detection signal from the carriage detector 38 is ON (YES at step S6), in other words when the carriage detector 38 detects the light shielding plate 34B provided on the carriage 34, the control unit 6 moves the carriage 34 to the right (forward movement) toward the document size reading position SP (step S7).

When the carriage 34 is moved toward the document size reading position SP, soon the signal from the carriage detector 38 is switched to a non-detection signal of the carriage 34 from the detection signal. At the time point where the signal from the carriage detector 38 is switched to the non-detection signal of the carriage 34 from the detection signal, the carriage 34 is at a predetermined position between the home position HP and the document size reading position SP. Accordingly, the control unit 6 can identify the position of the carriage 34, and therefore the control unit 6 can move the carriage 34 to the document size reading position SP or flow-scanning position RP, despite the homing process being skipped in the initialization from the sleep mode.

Then the control unit 6 decides whether the detection signal from the carriage detector 38 has turned to OFF when the carriage 34 is moved by a predetermined distance (step S8). Here, the predetermined distance is the distance between the home position HP and the predetermined position where the detection signal from the carriage detector 38 turns from ON to OFF. The carriage 34 is supposed to be located at the home position HP unless the carriage 34 is displaced during the sleep mode owing to vibration or the like. In this case, the carriage detector 38 outputs the detection signal of the OFF state. On the other hand, in the case where the carriage 34 has been displaced from the home position HP during the sleep mode owing to vibration or the like, the carriage detector 38 may still be outputting the detection signal of the OFF state, despite the carriage 34 having moved over the predetermined distance.

In the case where the detection signal from the carriage detector 38 has turned to OFF (YES at step S8), in other words when the carriage 34 is moved to a position where the light shielding plate 34B on the carriage 34 is not detected by the carriage detector 38, the control unit 6 continues to move the carriage 34 to the right in the sub scanning direction, and stops the carriage 34 when a reading line RL of the carriage 34 moves to the document size reading position SP (step S9). The control unit 6 can identify the time point where the reading line RL of the carriage 34 reaches the document size reading position SP shown in FIGS. 13E and 13F, on the basis of the number of pulses of a non-illustrated carriage driving motor with reference to the time point where the detection signal from the carriage detector 38 has turned from ON to OFF (see FIGS. 13C and 13D), and can thereby stop the carriage 34 at the document size reading position SP.

The control unit 6 then moves the carriage 34 to the left (backward movement) from the document size reading position SP toward the flow-scanning position RP. When the reading line RL of the carriage 34 reaches the flow-scanning position RP, the control unit 6 stops the movement of the carriage 34 (step S10). The control unit 6 can identify the time point where the reading line RL of the carriage 34 reaches the flow-scanning position RP shown in FIGS. 13G and 13H, on the basis of the number of pulses of the carriage driving motor with reference to the document size reading position SP, and can thereby stop the carriage 34 at the flow-scanning position RP.

Following the step S10, the control unit 6 causes the ADF 20 to sequentially deliver the source documents MS and causes the reading unit 30 to read the source documents MS delivered from the ADF 20 (step S11). Upon completing the reading of all the source documents MS, the control unit 6 moves the reading line RL of the carriage 34 to the home position HP (step S12). The control unit 6 can identify the time point where the reading line RL of the carriage 34 reaches the home position HP shown in FIGS. 13A and 13B, on the basis of the number of pulses of the carriage driving motor with reference to the flow-scanning position RP, and can thereby stop the carriage 34 at the home position HP.

Then the control unit 6 decides whether the operation should be turned to the sleep mode because of no instruction having been received for a predetermined period of time (step S13). In the case where the control unit 6 decides not to enter the sleep mode (NO at step S13), the control unit 6 returns to the step S4. In the case where the control unit 6 decides to enter the sleep mode (YES at step S13), the control unit 6 switches the operation to the sleep mode and finishes the process.

Figure 11:
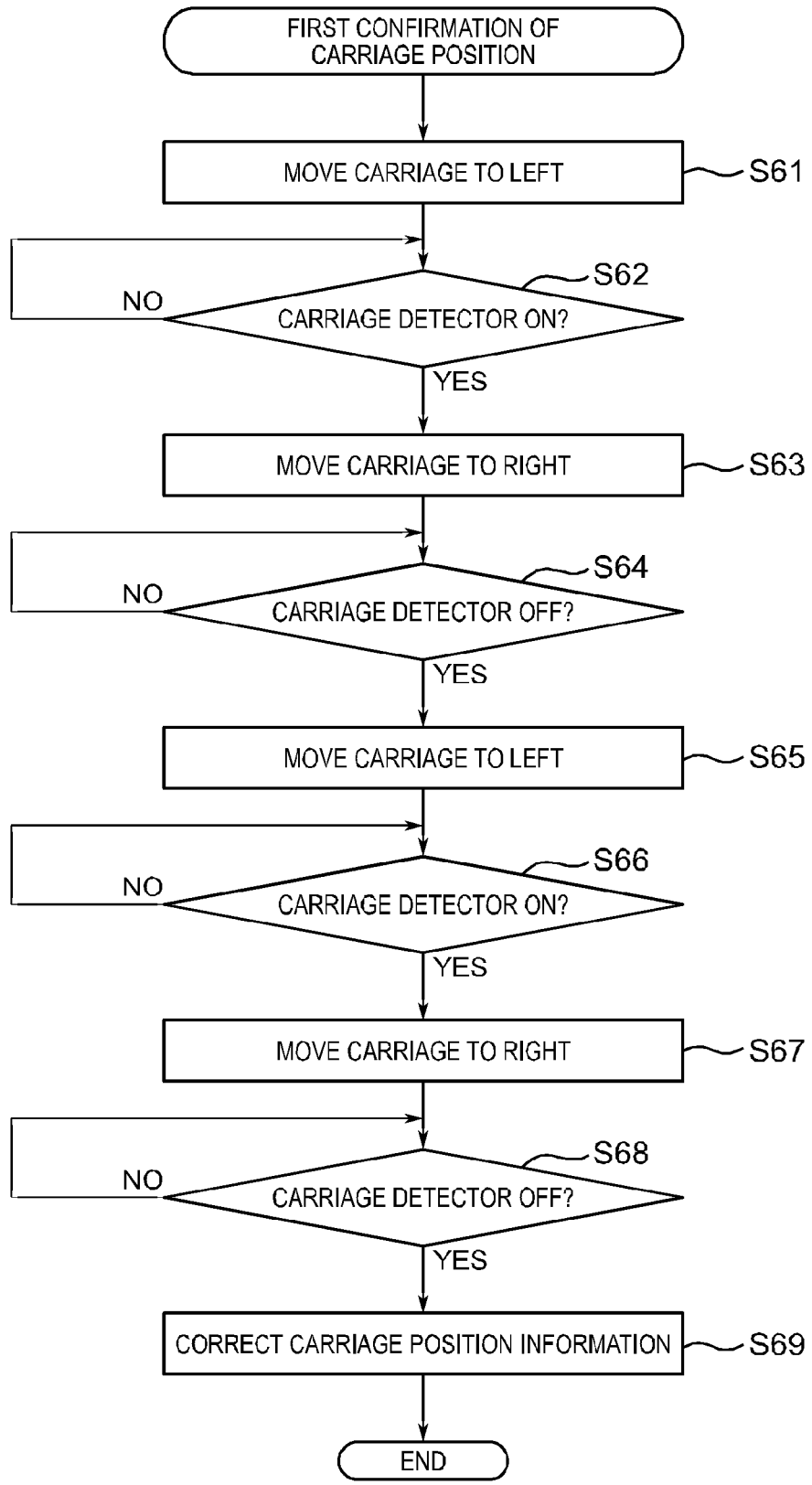
FIG. 11 is a flowchart showing an operation process of a multifunction peripheral according to the embodiment.

On the other hand, in the case where the detection signal from the carriage detector 38 is not ON at the step S6 (NO at step S6), in other words when the light shielding plate 34B is deviated from the region between the light emitter 38A and the light receiver 38B of the carriage detector 38, the control unit 6 performs a first carriage position confirmation (see FIG. 11). Specifically, the control unit 6 repeats the operation of moving the carriage 34 to the left (backward) until the carriage detector 38 detects the light shielding plate 34B and moving the carriage 34 to the right (forward) until the carriage detector 38 no longer detects the light shielding plate 34B, to thereby correct the position information of the carriage 34.

In the first carriage position confirmation, the control unit 6 first moves the carriage 34, located at a position where the light shielding plate 34B is deviated from the region between the light emitter 38A and the light receiver 38B of the carriage detector 38 (on the right of the carriage detector 38), to the left in the sub scanning direction (step S61). Then the control unit 6 decides whether the detection signal from the carriage detector 38 has turned to ON (whether the light shielding plate 34B is located between the light emitter 38A and the light receiver 38B) (step S62).

In the case where the detection signal from the carriage detector 38 has not turned to ON (remaining OFF) (NO at step S62), the control unit 6 returns to the step S62 and continues to move the carriage 34 to the left in the sub scanning direction until the detection signal turns to ON. In contrast, in the case where the detection signal from the carriage detector 38 has turned to ON (YES at step S62), the control unit 6 moves the carriage 34 to the right in the sub scanning direction (step S63).

Then the control unit 6 decides whether the detection signal from the carriage detector 38 has turned to OFF (whether the light shielding plate 34B is deviated from the region between the light emitter 38A and the light receiver 38B) (step S64). In the case where the detection signal from the carriage detector 38 has not turned to OFF (remaining ON) (NO at step S64), the control unit 6 returns to the step S64, and continues to move the carriage 34 to the right in the sub scanning direction until the detection signal turns to OFF. In contrast, in the case where the detection signal from the carriage detector 38 has turned to OFF (YES at step S64), the control unit 6 moves the carriage 34 to the left in the sub scanning direction (step S65).

The control unit 6 then decides whether the detection signal from the carriage detector 38 has turned to ON (step S66). In the case where the detection signal from the carriage detector 38 has not turned to ON (remaining OFF) (NO at step S66), the control unit 6 returns to the step S66, and continues to move the carriage 34 to the left in the sub scanning direction until the detection signal turns to ON. In contrast, in the case where the detection signal from the carriage detector 38 has turned to ON (YES at step S66), the control unit 6 moves the carriage 34 to the right in the sub scanning direction (step S67).

Again, the control unit 6 decides whether the detection signal from the carriage detector 38 has turned to OFF (step S68). In the case where the detection signal from the carriage detector 38 has not been turned to OFF (remaining ON) (NO at step S68), the control unit 6 returns to the step S68, and continues to move the carriage 34 to the right in the sub scanning direction until the detection signal turns to OFF. In contrast, in the case where the detection signal from the carriage detector 38 has turned to OFF (YES at step S68), the control unit 6 corrects the position information of the carriage 34. In other words, the control unit 6 stores the number of pulses of the carriage driving motor at the time point where the detection signal from the carriage detector 38 has turned from ON to OFF (step S69).

Figure 12:
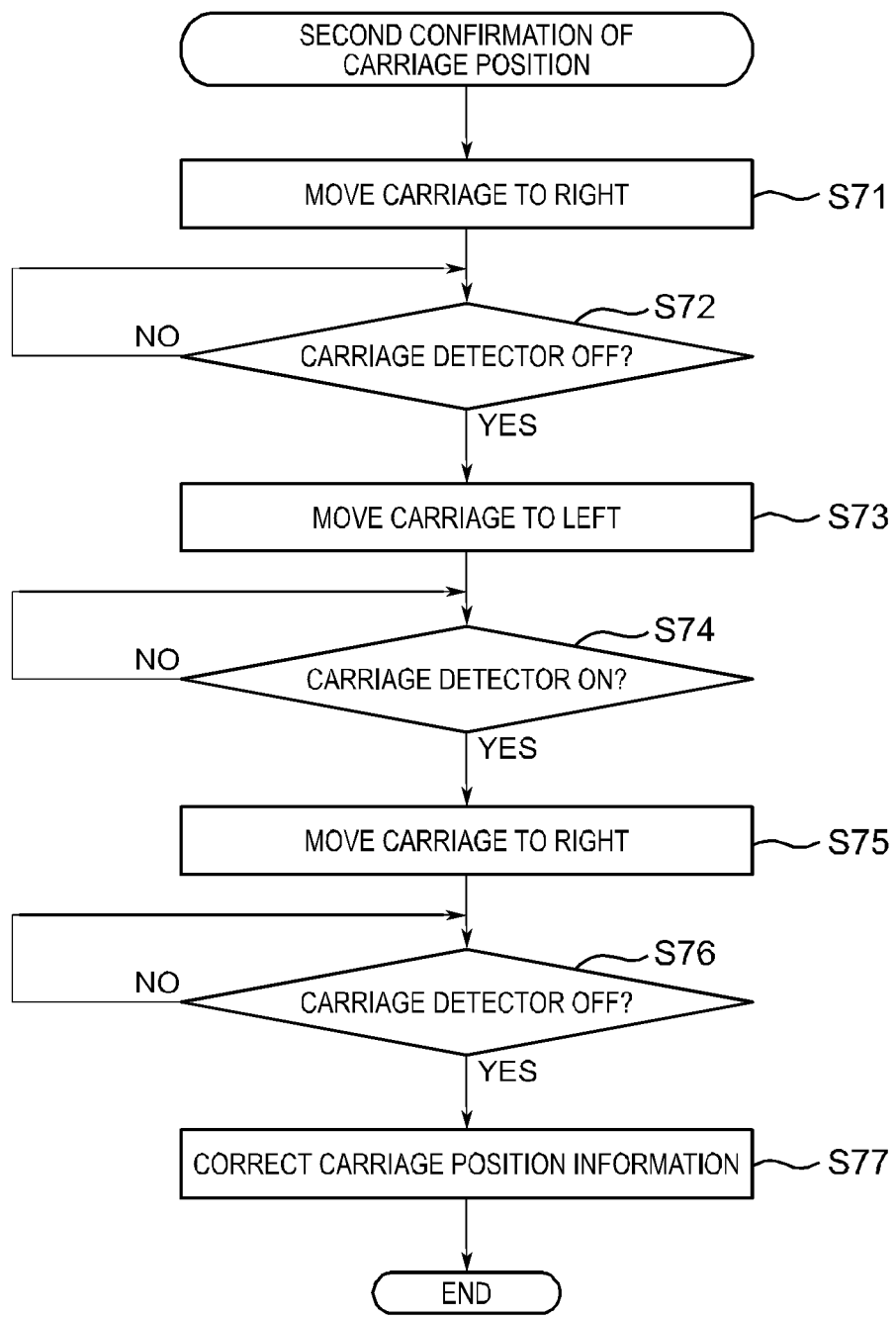
FIG. 12 is a flowchart showing an operation process of a multifunction peripheral according to the embodiment.

Referring again to the step S8, in the case where the detection signal from the carriage detector 38 is not OFF at the step 8 (NO at step S8), in other words in the case where the detection signal from the carriage detector 38 has not turned to OFF despite the carriage 34 having moved over the predetermined distance, it is assumed that the carriage 34 was not located at the home position HP when the sleep mode was cancelled, and therefore the control unit 6 performs a second carriage position confirmation (see FIG. 12). Specifically, the control unit 6 repeats the operation of moving the carriage 34 to the right (forward) until the carriage detector 38 no longer detects the light shielding plate 34B and moving the carriage 34 to the left (backward) until the carriage detector 38 detects the light shielding plate 34B, to thereby correct the position information of the carriage 34.

In the second carriage position confirmation, the control unit 6 first moves the carriage 34, located at a position where the light shielding plate 34B is located between the light emitter 38A and the light receiver 38B of the carriage detector 38, to the right in the sub scanning direction (step S71). Then the control unit 6 decides whether the detection signal from the carriage detector 38 has turned to OFF (whether the light shielding plate 34B is deviated from the region between the light emitter 38A and the light receiver 38B) (step S72).

In the case where the detection signal from the carriage detector 38 has not turned to OFF (remaining ON) (NO at step S72), the control unit 6 returns to the step S72, and continues to move the carriage 34 to the right in the sub scanning direction until the detection signal turns to OFF. In contrast, in the case where the detection signal from the carriage detector 38 has turned to OFF (YES at step S72), the control unit 6 moves the carriage 34 to the left in the sub scanning direction (step S73).

The control unit 6 then decides whether the detection signal from the carriage detector 38 has turned to ON (whether the light shielding plate 34B is located between the light emitter 38A and the light receiver 38B) (step S74). In the case where the detection signal from the carriage detector 38 has not turned to ON (remaining OFF) (NO at step S74), the control unit 6 returns to the step S74, and continues to move the carriage 34 to the left in the sub scanning direction until the detection signal turns to ON. In contrast, in the case where the detection signal from the carriage detector 38 has turned to ON (YES at step S74), the control unit 6 moves the carriage 34 to the right in the sub scanning direction (step S75).

Then the control unit 6 decides whether the detection signal from the carriage detector 38 has turned to OFF (step S76). In the case where the detection signal from the carriage detector 38 has not turned to OFF (remaining ON) (NO at step S76), the control unit 6 returns to the step S76, and continues to move the carriage 34 to the right in the sub scanning direction until the detection signal turns to OFF. In contrast, in the case where the detection signal from the carriage detector 38 has turned to OFF (YES at step S76), the control unit 6 corrects the position information of the carriage 34, i.e., stores the number of pulses of the carriage driving motor at the time point where the detection signal from the carriage detector 38 has turned from ON to OFF (step S77).

Figure 8:
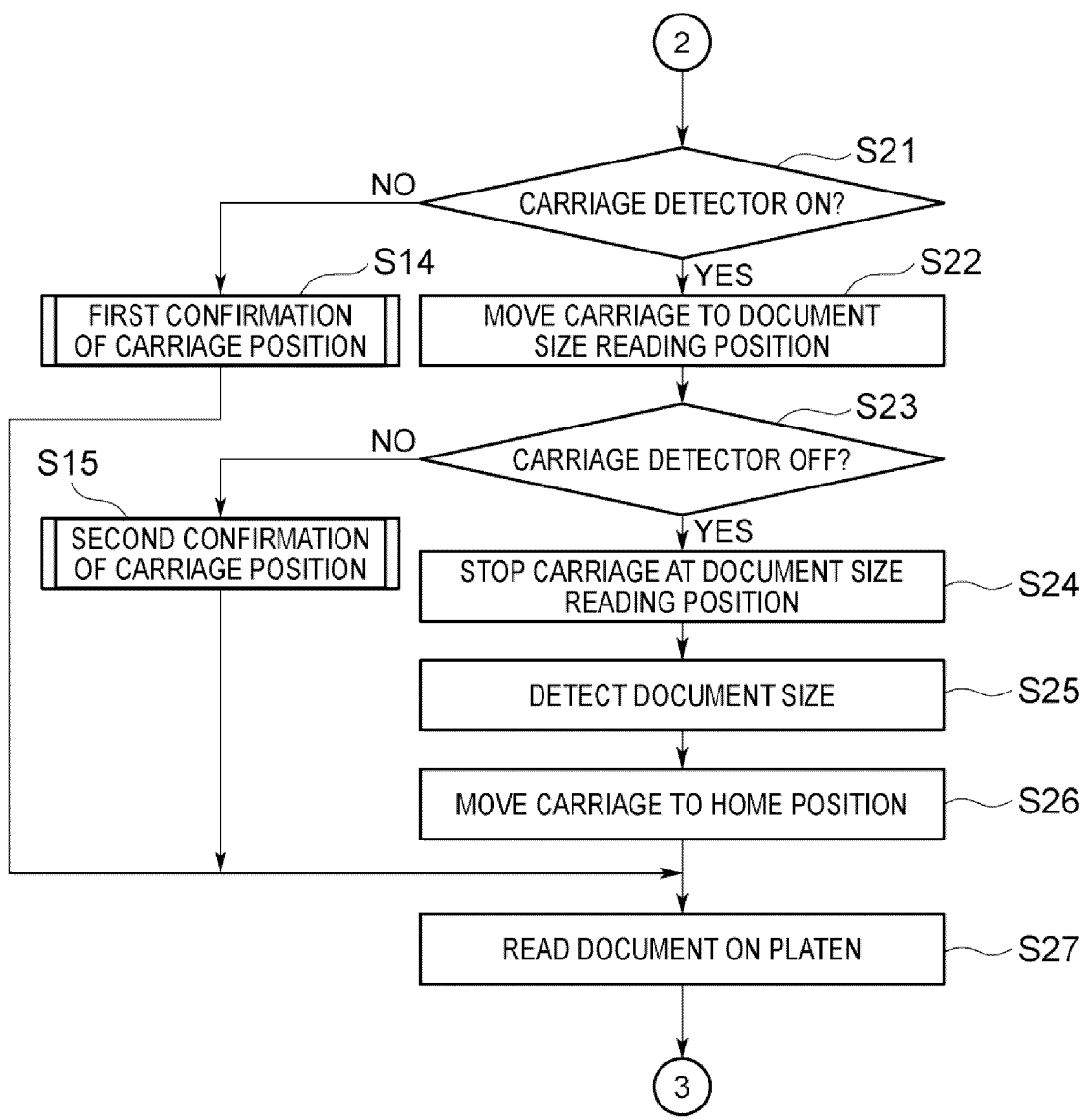
FIG. 8 is a flowchart showing an operation process of a multifunction peripheral according to the embodiment.

Referring again to the step S5, in the case where the source document MS is not set on the document feed tray 22 of the ADF 20 (NO at step S5), the control unit 6 decides whether the detection signal from the carriage detector 38 is ON (whether the light shielding plate 34B is located between the light emitter 38A and the light receiver 38B of the carriage detector 38), as shown in FIG. 8 (step S21).

In the case where the detection signal from the carriage detector 38 is ON (YES at step S21), the control unit 6 moves the carriage 34 to the right (forward movement) toward the document size reading position SP (step S22). The control unit 6 then decides whether the detection signal from the carriage detector 38 has turned to OFF (whether the light shielding plate 34B is deviated from the region between the light emitter 38A and the light receiver 38B of the carriage detector 38) (step S23).

In the case where the detection signal from the carriage detector 38 has turned to OFF (YES step S23), the control unit 6 continues to move the carriage 34 to the right in the sub scanning direction, and stops the carriage 34 at the document size reading position SP (step S24). The control unit 6 can decide that the carriage 34 has reached the document size reading position SP shown in FIGS. 13E and 13F, for example on the basis of the number of pulses of the carriage driving motor with reference to the time point where the detection signal from the carriage detector 38 has turned from ON to OFF (see FIGS. 13C and 13D).

Then the control unit 6 detects the size of the source document MS on the basis of the image data outputted from the CCD sensor 37 to the image data storage unit 8 (step S25). Upon completing the document size detection, the control unit 6 moves the carriage 34 to the home position HP (step S26). The control unit 6 can decide that the carriage 34 has reached the home position HP shown in FIGS. 13A and 13B, for example on the basis of the number of pulses of the carriage driving motor with reference to the document size reading position SP.

Following the step S26, the control unit 6 reads the source document MS on the second platen glass 32 (step S27). The carriage 34 emits light to the source document MS while moving to the right in the sub scanning direction under the second platen glass 32, to read the source document MS.

At the step S21, in the case where the detection signal from the carriage detector 38 is not ON (NO at step S21), in other words when the light shielding plate 34B is deviated from the region between the light emitter 38A and the light receiver 38B of the carriage detector 38, the control unit 6 performs the first carriage position confirmation (see FIG. 11). In contrast, in the case where the detection signal from the carriage detector 38 is not OFF at the step S23 (NO at step S23), in other words when the light shielding plate 34B is located between the light emitter 38A and the light receiver 38B of the carriage detector 38, the control unit 6 performs the second carriage position confirmation (see FIG. 12).

Figure 9:
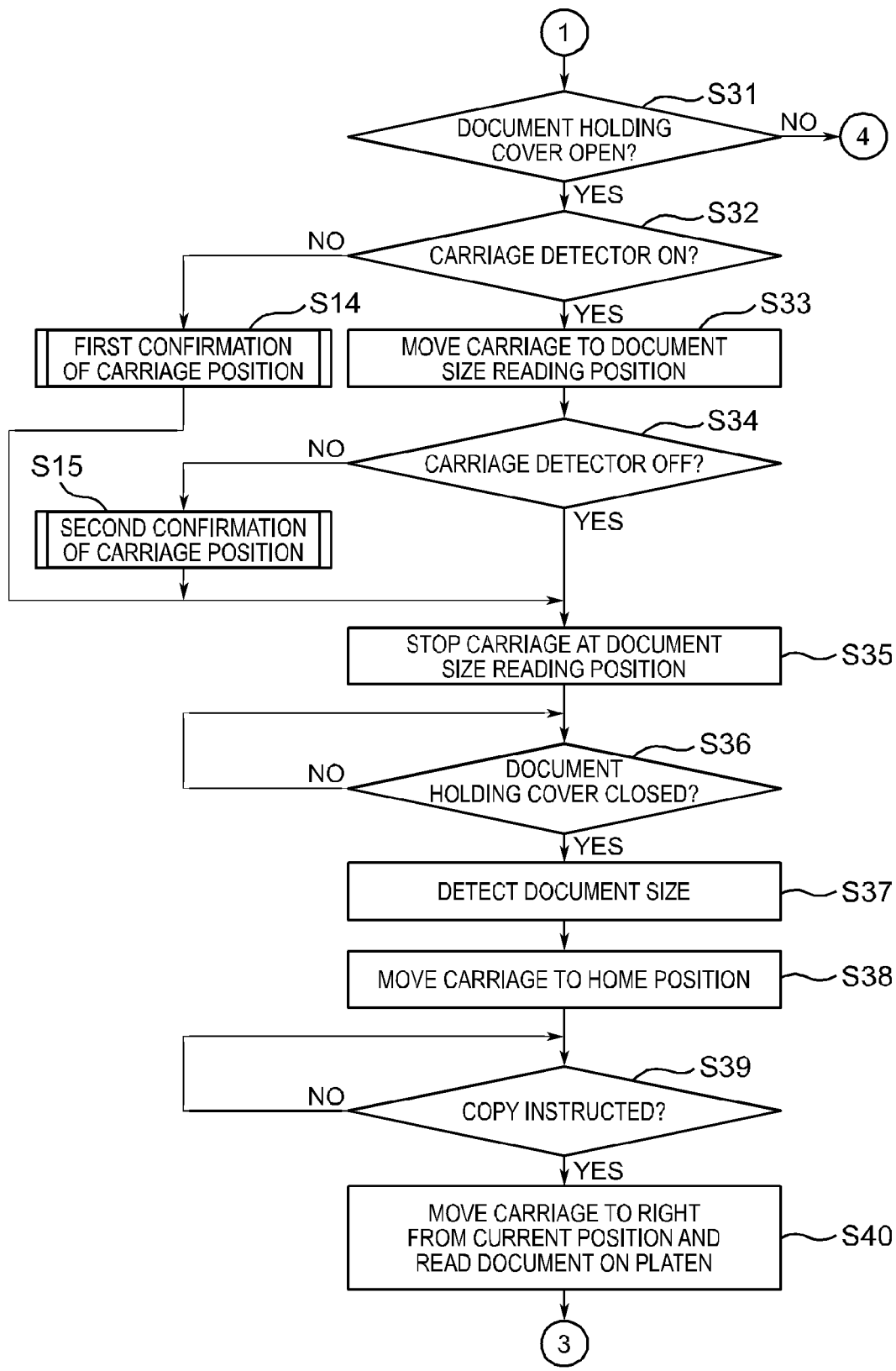
FIG. 9 is a flowchart showing an operation process of a multifunction peripheral according to the embodiment.
Figure 10:
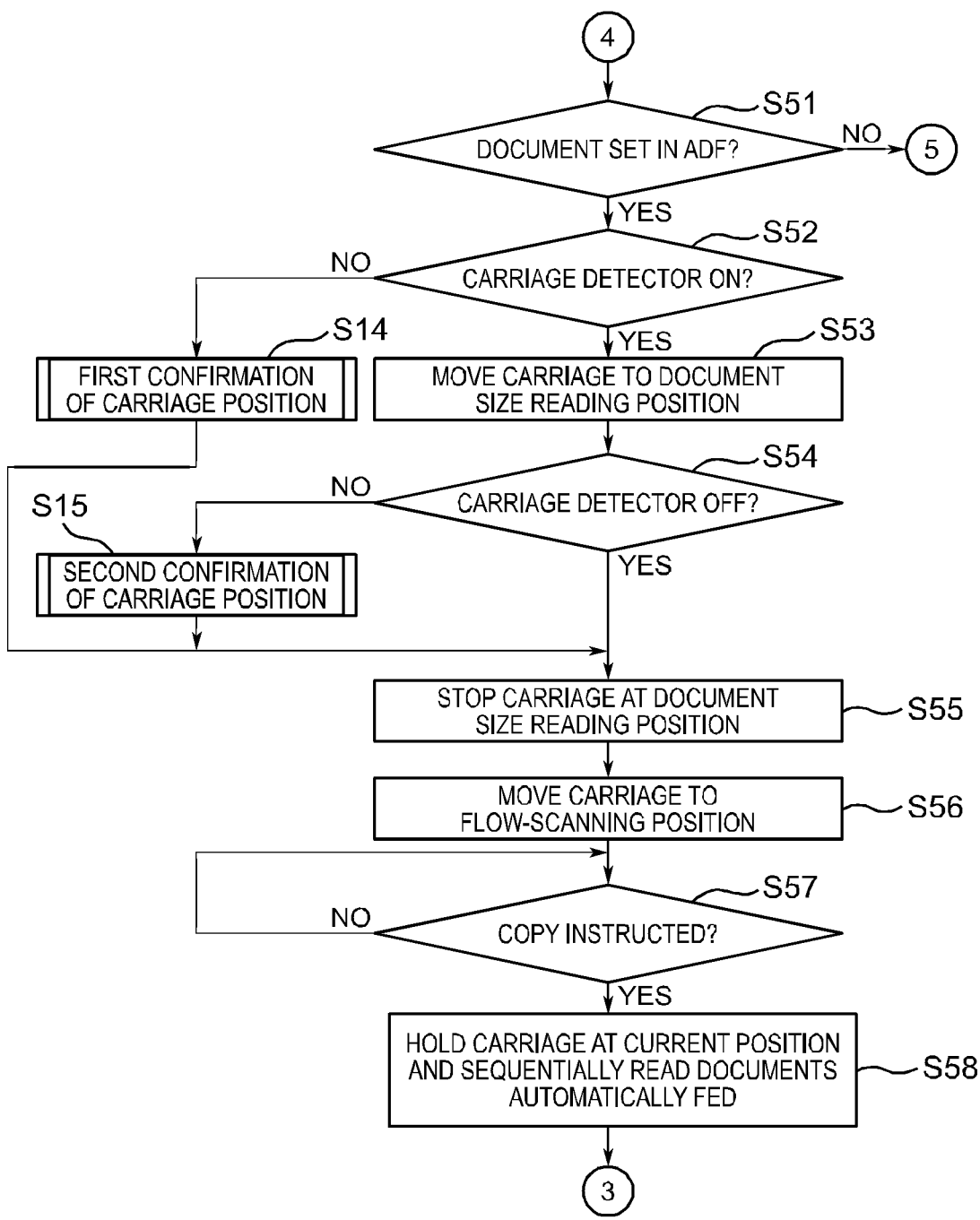
FIG. 10 is a flowchart showing an operation process of a multifunction peripheral according to the embodiment.

At the step S4, in the case where the copying instruction has not been received (NO at step 4), the control unit 6 decides whether the ADF 20 is open in its use as the document holding cover, according to the detection signal from the ADF position detector 29, as shown in FIG. 9 (step S31). In the case where the ADF 20 is open (YES at step S31), the control unit 6 decides whether the detection signal from the carriage detector 38 is ON (whether the light shielding plate 34B is located between the light emitter 38A and the light receiver 38B of the carriage detector 38) (step S32).

In the case where the detection signal from the carriage detector 38 is ON (YES at step S32), the control unit 6 moves the carriage 34 to the right in the sub scanning direction toward the document size reading position SP (step S33). The control unit 6 then decides whether the detection signal from the carriage detector 38 has turned to OFF (whether the light shielding plate 34B is deviated from the region between the light emitter 38A and the light receiver 38B) (step S34).

In the case where the detection signal from the carriage detector 38 has turned to OFF (YES step S34), the control unit 6 continues to move the carriage 34 to the right in the sub scanning direction, and stops the carriage 34 at the document size reading position SP (step S35). The control unit 6 can decide that the carriage 34 has reached the document size reading position SP shown in FIGS. 13E and 13F, for example on the basis of the number of pulses of the carriage driving motor with reference to the time point where the detection signal from the carriage detector 38 has turned from ON to OFF (see FIGS. 13C and 13D).

Then the control unit 6 decides whether the ADF 20 is closed in its use as the document holding cover, according to the detection signal from the ADF position detector 29 (step S36). In the case where the ADF 20 is not closed (remaining open) (NO at step S36), the control unit 6 returns to the step S36 and stands by until the ADF 20 is closed. In contrast, in the case where the ADF 20 is closed to serve as document holding cover (YES at step S36), the control unit 6 detects the size of the source document MS on the basis of the acquired image data (step S37).

Upon completing the document size detection, the control unit 6 moves the carriage 34 to the home position HP (step S38).

Following the step S38, the control unit 6 decides whether a copying instruction (reading instruction) has been received by a press of the start key 52B (step S39). In the case where the copying instruction has not been received (NO at step S39), the control unit 6 returns to the step S39 and stands by until the copying instruction is received. In the case where the copying instruction has been received (YES at step S39), the control unit 6 moves the carriage 34 from the current position to the right in the sub scanning direction and reads the source document MS on the second platen glass 32 (step S40). Thus, the control unit 6 does not move the carriage 34 to the home position HP immediately before reading the source document MS on the second platen glass 32. Here, the carriage 34 is supposed to be located at the home position HP as shown in FIGS. 13A and 13B, unless the carriage is displaced during the sleep mode owing to vibration or the like.

As above, the operation according to this embodiment skips the process of moving the carriage 34 to the home position HP before reading the source document MS on the second platen glass 32, and therefore the time before starting to read the source document MS can be shortened.

At the step S32, in the case where the detection signal from the carriage detector 38 is not ON (NO at step S32), in other words when the light shielding plate 34B is deviated from the region between the light emitter 38A and the light receiver 38B of the carriage detector 38, the control unit 6 performs the first carriage position confirmation (see FIG. 11). In contrast, in the case where the detection signal from the carriage detector 38 is not OFF at the step S34 (NO at step S34), in other words when the light shielding plate 34B is located between the light emitter 38A and the light receiver 38B of the carriage detector 38, the control unit 6 performs the second carriage position confirmation (see FIG. 12).

In the case where the ADF 20 is not open in its use as the document holding cover (NO at step S31), the control unit 6 decides whether the source document MS is set on the document feed tray 22 of the ADF 20, according to the detection signal inputted from the document setting detection unit 23 (step S51).

In the case where the source document MS is set on the document feed tray 22 of the ADF 20 (YES at step S51), the control unit 6 decides whether the detection signal from the carriage detector 38 is ON (whether the light shielding plate 34B is located between the light emitter 38A and the light receiver 38B of the carriage detector 38) (step S52). In the case where the detection signal from the carriage detector 38 is ON (YES at step S52), in other words, when the light shielding plate 34B is detected by the carriage detector 38, the control unit 6 moves the carriage 34 to the right toward the document size reading position SP, by controlling a driving source such as a stepping motor (not shown) (step S53). The control unit 6 then decides whether the detection signal from the carriage detector 38 is OFF (whether the light shielding plate 34B is deviated from the region between the light emitter 38A and the light receiver 38B of the carriage detector 38) (step S54).

In the case where the detection signal from the carriage detector 38 has turned to OFF, in other words when the light shielding plate 34B moves to a position where the carriage detector 38 no longer detects the light shielding plate 34B (YES at S54), the control unit 6 continues to move the carriage 34 to the right in the sub scanning direction, and stops the carriage 34 when the reading line RL reaches the document size reading position SP (step S55). The control unit 6 can decide that the carriage 34 has reached the document size reading position SP shown in FIGS. 13E and 13F, on the basis of the number of pulses of the carriage driving motor with reference to the time point where the detection signal from the carriage detector 38 has turned from ON to OFF (see FIGS. 13C and 13D).

The control unit 6 then moves the carriage 34 to the left from the document size reading position SP toward the flow-scanning position RP, and stops the carriage 34 when the reading line RL reaches the flow-scanning position RP (step S56).

Following the step S56, the control unit 6 decides whether a copying instruction (reading instruction) has been received by a press of the start key 52B (step S57). In the case where the copying instruction has not been received (NO at step S57), the control unit 6 returns to the step S57 and stands by until the copying instruction is received. In contrast, in the case where the copying instruction has been received (YES at step S57), the control unit 6 causes the ADF 20 to sequentially deliver the source documents MS and causes the reading unit 30 to read the source documents MS delivered from the ADF 20, keeping the carriage 34 at the current position (step S58).

Figure 13G:
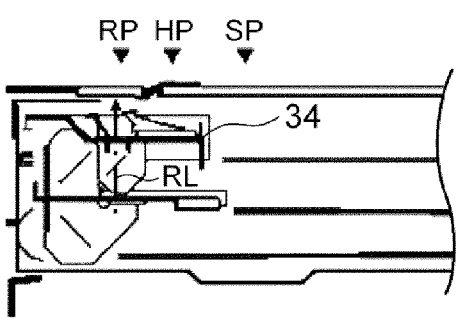
Figure 13H:
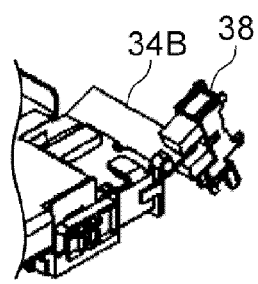

Thus, the control unit 6 does not move the carriage 34 to the home position HP immediately before reading the source document MS delivered by the ADF 20. Here, the carriage 34 is supposed to be located at the flow-scanning position RP as shown in FIGS. 13G and 13H when the source document MS delivered by the ADF 20 is to be read, unless the carriage is displaced during the sleep mode owing to vibration or the like.

As above, the operation according to this embodiment skips the process of moving the carriage 34 to the home position HP before reading the source document MS delivered by the ADF 20, and therefore the time before starting to read the source document MS can be shortened.

At the step S52, in the case where the detection signal from the carriage detector 38 is not ON (NO at step S52), in other words when the light shielding plate 34B is deviated from the region between the light emitter 38A and the light receiver 38B of the carriage detector 38, the control unit 6 performs the first carriage position confirmation (see FIG. 11). In contrast, in the case where the detection signal from the carriage detector 38 is not OFF at the step S54 (NO at step S54), in other words when the light shielding plate 34B is located between the light emitter 38A and the light receiver 38B of the carriage detector 38, the control unit 6 performs the second carriage position confirmation (see FIG. 12). In addition, in the case where the source document MS is not set on the document feed tray 22 of the ADF 20 at the step S5 (NO at step S5), the control unit 6 returns to the step S4.

The multifunction peripheral 1 according to this embodiment includes the carriage detector 38 that outputs the ON-signal when the carriage 34 is at the home position HP and outputs the OFF-signal when the carriage 34 is located closer to the document size reading position SP than the predetermined position between the home position HP and the document size reading position SP. In addition, the multifunction peripheral 1 moves the carriage 34 toward the document size reading position SP when the carriage 34 is detected by the carriage detector 38, in the case where the control unit 6 (reception unit) has received the instruction to read the source document, or in the case where the document setting detection unit 23 and the ADF position detector 29 (detection unit) have detected the setting operation of the source document on the image reading apparatus 1.

The multifunction peripheral 1 is capable of identifying the position of the carriage 34 at the time point where the carriage 34 moves from a position where the carriage detector 38 can detect the carriage 34 to a position where the carriage detector 38 is unable to detect the carriage 34, and therefore the carriage 34 can be moved to the document size reading position SP or the flow-scanning position RP, despite the homing process of the carriage 34 being skipped in the initialization after the sleep mode.

Further, the multifunction peripheral 1 according to this embodiment corrects the position information of the carriage 34 when the carriage 34 is not detected by the carriage detector 38, in the case where the control unit 6 (reception unit) has received the instruction to read the source document, or in the case where the document setting detection unit 23 and the ADF position detector 29 (detection unit) have detected the setting operation of the source document on the image reading apparatus 1.

Although an exemplary embodiment of the disclosure has been described as above, various modifications may be made within the scope of the disclosure, a few examples of which will be cited hereunder.

(1) In the foregoing embodiment, the homing process is skipped on the assumption that the carriage 34 is located at the home position HP when the sleep mode is over. However, the carriage 34 may be displaced during the sleep mode. In such a case the correct reference image may fail to be acquired when reading the reference image for shading correction, and thus the shading correction may fail to be properly performed. Therefore, it is preferable to move the carriage 34 to the home position HP after confirming the position of the carriage 34 while moving the carriage 34 toward the document size reading position SP, when the shading correction is to be performed.

(2) In the case where the position of the carriage 34 has failed to be normally identified while the carriage 34 is being moved toward the document size reading position SP, the LCD touch panel 13 may display a message to the effect that the position information has been unable to be normally identified.

Various modifications and alterations of this disclosure will be apparent to those skilled in the art without departing from the scope and spirit of this disclosure, and it should be understood that this disclosure is not limited to the illustrative embodiments set forth herein.

What is claimed is:
1. An image reading apparatus comprising:
a document table;

a document holding cover that detains a source document placed on the document table;
a position detector configured to detect an operation of opening or closing the document holding cover;
an automatic document feeder (ADF) including a document feed tray and a document setting detection unit configured to detect an operation of setting the source document on the document feed tray;
a reading unit including a carriage configured to reciprocate in a sub scanning direction, and emit reading light onto a source document placed on the document table and receive reflected light of the reading light;
a carriage detector located between a home position and a document size reading position of the carriage, and configured to (i) output a detection signal of the carriage when the carriage is at the home position and (ii) output a non-detection signal of the carriage when the carriage is located closer to the document size reading position than a predetermined position between the home position and the document size reading position;
a reception unit configured to receive an instruction to read the source document;
and
a control unit configured to control a position of the carriage,
the control unit being configured to (i) move the carriage to the home position when the image reading apparatus enters a sleep mode, (ii) keep the carriage detained when initialization is to be performed after the sleep mode is cancelled, (iii) enter a standby state in a normal mode after completing the initialization, (iv) confirm, after the initialization is completed, a signal outputted from the carriage detector in the case where the reception unit receives the reading instruction in the normal mode, in the case where the position detector detects the operation of opening or closing the document holding cover in the normal mode, or in the case where the document setting detection unit detects the operation of setting the source document on the document feed tray of the ADF in the normal mode, (v) move the carriage toward the document size reading position in the case where the carriage detector outputs the detection signal of the carriage, and (vi) identify a position of the carriage at a time point where the signal from the carriage detector is switched to the non-detection signal from the detection signal.

2. The image reading apparatus according to claim 1, wherein the control unit is configured to confirm the signal outputted from the carriage detector after the initialization is completed, in the case where the reception unit receives the reading instruction, in the case where the position detector detects the operation of opening or closing the document holding cover, or in the case where the document setting detection unit detects the operation of setting the source document on the document feed tray of the ADF, and correct position information of the carriage in the case where the carriage detector outputs the non-detection signal of the carriage.

3. The image reading apparatus according to claim 2, wherein the control unit is configured to correct the position information of the carriage by repeating an operation of moving the carriage toward the document size reading position until the carriage detector outputs the non-detection signal of the carriage and an operation of moving the carriage away from the document size reading position until the carriage detector outputs the detection signal of the carriage.

4. An image forming apparatus comprising:
a document table;
a document holding cover that detains a source document placed on the document table;
a position detector configured to detect an operation of opening or closing the document holding cover;
an automatic document feeder (ADF) including a document feed tray and a document setting detection unit configured to detect an operation of setting the source document on the document feed tray;
a reading unit including a carriage configured to reciprocate in a sub scanning direction, and emit reading light onto a source document placed on the document table and receive reflected light of the reading light;
a carriage detector located between a home position and a document size reading position of the carriage, and configured to (i) output a detection signal of the carriage when the carriage is at the home position and (ii) output a non-detection signal of the carriage when the carriage is located closer to the document size reading position than a predetermined position between the home position and the document size reading position;
a reception unit configured to receive an instruction to read the source document;
a control unit configured to control a position of the carriage; and
an image forming unit configured to form an image read by the reading unit on a recording sheet,
wherein the control unit being configured to (i) move the carriage to the home position when the image reading apparatus enters a sleep mode, (ii) keep the carriage detained when initialization is to be performed after the sleep mode is cancelled, (iii) enter a standby state in a normal mode after completing the initialization, (iv) confirm, after the initialization is completed, a signal outputted from the carriage detector in the case where the reception unit receives the reading instruction in the normal mode, in the case where the position detector detects the operation of opening or closing the document holding cover in the normal mode, or in the case where the document setting detection unit detects the operation of setting the source document on the document feed tray of the ADF in the normal mode, and (v) move the carriage toward the document size reading position in the case where the carriage detector outputs the detection signal of the carriage, and identify a position of the carriage at a time point where the signal from the carriage detector is switched to the non-detection signal from the detection signal.

5. The image forming apparatus according to claim 4, wherein the control unit is configured to confirm the signal outputted from the carriage detector after the initialization is completed, in the case where the reception unit receives the reading instruction, in the case where the position detector detects the operation of opening or closing the document holding cover, or in the case where the document setting detection unit detects the operation of setting the source document on the document feed tray of the ADF, and correct position information of the carriage in the case where the carriage detector outputs the non-detection signal of the carriage.

6. The image forming apparatus according to claim 5, wherein the control unit is configured to correct the position information of the carriage by repeating an operation of moving the carriage toward the document size reading position until the carriage detector outputs the non-detection signal of the carriage and an operation of moving the carriage away from the document size reading position until the carriage detector outputs the detection signal of the carriage.

* * * * *